Sept. 1, 1942.  E. E. HEWITT ET AL  2,294,600
RAILWAY VEHICLE BRAKE
Filed Oct. 31, 1940  2 Sheets-Sheet 1

INVENTORS
ELLIS E. HEWITT
BURTON S. AIKMAN
BY
ATTORNEY

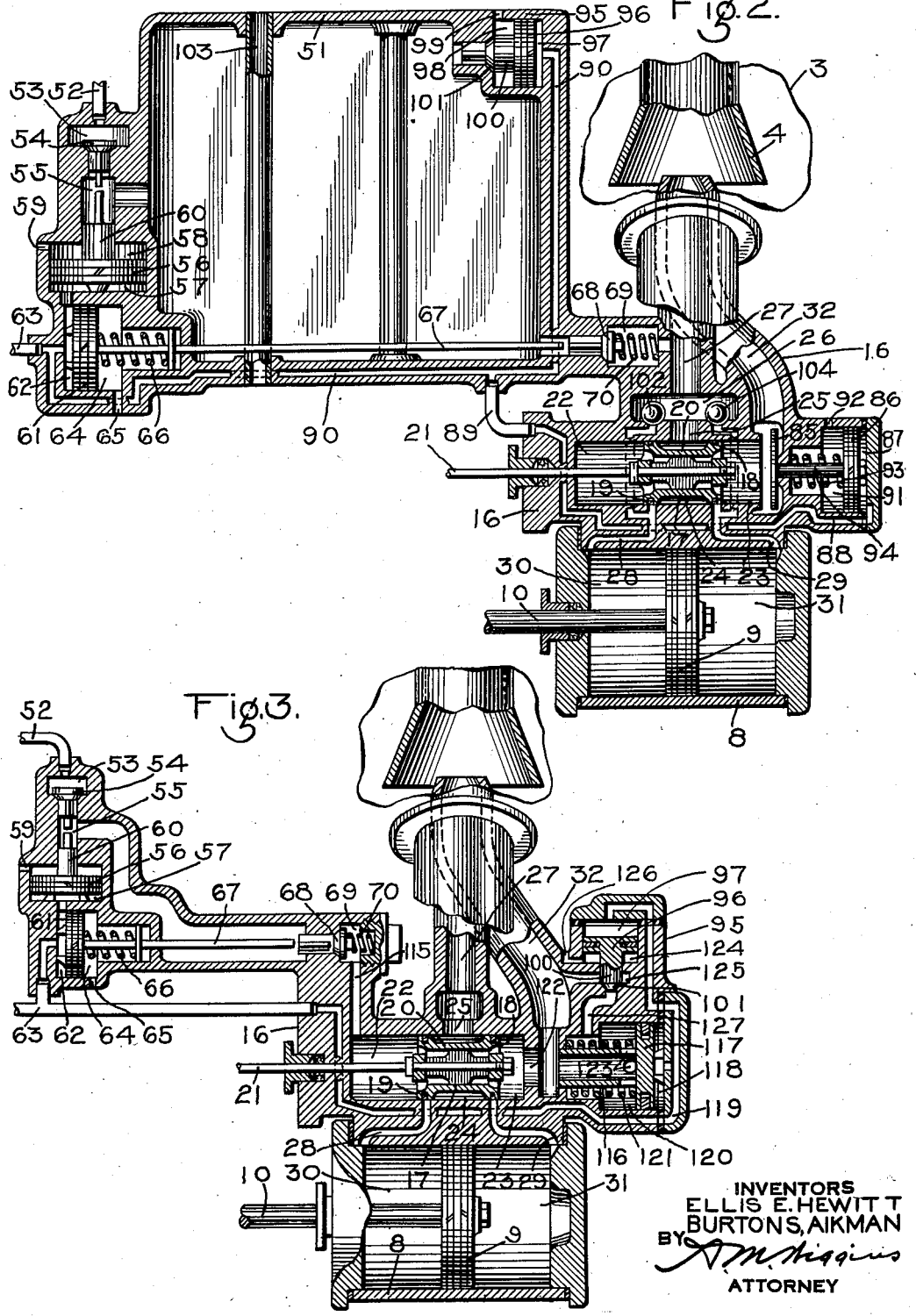

Patented Sept. 1, 1942

2,294,600

UNITED STATES PATENT OFFICE 2,294,600

RAILWAY VEHICLE BRAKE

Ellis E. Hewitt, Edgewood, and Burton S. Aikman, Wilkinsburg, Pa., assignors to The Westinghouse Air Brake Company, Wilmerding, Pa., a corporation of Pennsylvania Application October 31, 1940, Serial No. 363,592

31 Claims. (Cl. 303—2)

This invention relates to fluid pressure brakes and more particularly to braking means for steam driven railway locomotives.

One object of the invention is the provision of improved arrangements whereby the usual steam actuated driver pistons of steam locomotives may be used for braking the locomotive and a train coupled thereto.

Another object of the invention is the provision of an improved brake arrangement such as just set forth in which the degree of braking may be varied from an amount corresponding substantially to the full tractive effort of the locomotive to any lesser amount, as determined by the selective operation of a brake valve device in the locomotive cab by the engineer.

In accordance with these objects means are provided under the control of the engineer whereby steam at any desired pressure up to that carried in the boiler, if desired, may be applied to the usual locomotive driver pistons to oppose movement thereof by the locomotive driver wheels so as to thereby brake said wheels to any desired degree. With this arrangement it will be apparent that if steam at boiler pressure is applied to the driver pistons for braking same, the degree of braking will be equal substantially to the tractive effort of the locomotive. Thus if a locomotive is able to haul a train up a grade, it will by itself be also able to provide an equivalent force for braking the train down the grade. Any lesser degree of braking may be obtained however if desired at other times or under different conditions by selective operation of the brake valve device by the engineer.

By the use of this dynamic type of brake for steam locomotives, excessive heating and wear of the tires on the driver wheels, such as occurs with conventional type of brake equipment incident to frictional contact by the usual brake shoes, is entirely avoided.

Other objects and advantages will be apparent from the following more detailed description of the invention.

Description

In the accompanying drawings; Fig. 1 is a side elevational view, in substantial line diagram form, of a steam locomotive having associated therewith in elevation one embodiment of the invention; Fig. 2 is a diagrammatic view, mainly in section, of the embodiment of the invention and certain pertinent parts of the locomotive shown in Fig. 1; and Fig. 3 is a diagrammatic sectional view similar to Fig. 2 of another embodiment of the invention.

As shown in Fig. 1, the locomotive employed for the purpose of illustration is of conventional structure comprising a boiler 1 which is provided with the usual steam dome 2 from which steam for propelling the locomotive is adapted to be taken upon operation of the usual throttle (not shown) by the engineer. At the front end of the boiler 1 is the usual smoke box 3 from which projects the smoke stack 4, while at the opposite end of the boiler is the cab 5 for the engineer and fireman. In the illustration the boiler 1 and other parts of the locomotive are carried at each side of the locomotive by three driver wheels 6 and two truck wheels 7 in any conventional manner (not shown).

At each side of the locomotive is the usual steam cylinder 8 which, as shown in Fig. 2, contains a reciprocating power piston 9. The piston 9 has a piston rod 10 which extends through the back end of the cylinder 8. The outer end of rod 10 is connected to a cross-head 11 supported to slide in suitable guides 12. The three driver wheels 6 are connected by a side rod 13 through the medium of crank pins 14. One end of a main rod 15 is connected to the piston rod 10 at its connection with the cross-head 11 while the other end is connected to the crank pin 14 at the center drive wheel 6. The piston 9 is adapted upon reciprocation under the influence of steam pressure to act through the rod 10 and main rod 15 to apply force to the side rod 13 for turning the driver wheels 6 of the locomotive in either one direction or the other to propel the locomotive in the usual manner.

Above the steam cylinder 8 is the usual steam chest 16 which contains a reversing valve 17. This valve may be of any conventional type but, as shown, is of the piston type comprising two spaced pistons 18 and 19 which are spaced apart and connected for movement in unison by a central cylindrical portion 20. The reversing valve is operatively connected to a reversing rod 21 and has suitable openings connecting an exhaust chamber 22 at the outer face of piston 19 to an exhaust chamber 23 at the outer face of the piston 18; the chamber 23 being normally open to the usual exhaust passage 32 which leads to the lower open end of the smoke stack 4 within the smoke box 3. The cylindrical portion 20 of the reversing valve is of smaller diameter than the pistons 18 and 19 so as to provide an annular steam supply chamber 24 between the pistons.

The annular chamber 24 is connected through a port 25 and a cavity 26 to a steam supply passage 27 in the steam chest to which steam for driving the locomotive is adapted to be supplied upon operation of the usual throttle by the engineer. The reversing valve 17 is adapted to control communication between the steam supply port 25 and two passages 28 and 29 leading, respectively, to chambers 30 and 31 at the rear and front faces of piston 9 in the steam cylinder 8.

The reversing valve 17 has a neutral position shown in Fig. 2 in which both passages 28 and 29 are lapped and is adapted to be moved from this position toward the right hand to a position in which passage 29 is opened to the annular cavity 24 and passage 28 is open to the exhaust chamber 22. In this position chamber 30 will therefore be vented and steam is adapted to be supplied to chamber 31 for driving piston 9 toward the rear of cylinder 8 to thereby turn the driver wheels 6 for propelling the locomotive. The reversing valve 17 is also adapted to be moved to a position to the right of the neutral position for venting the chamber 31 and for supplying steam to chamber 30 to thereby move the piston 9 forwardly in the cylinder to also impart rotation to the driver wheels. Alternate movement of the reversing valve to its different extreme positions by means to be hereinafter described is thus adapted to effect reciprocation of piston 9 to turn the driver wheels 6 in the usual manner.

For convenience in describing the operation of the piston 9, due to pressure being supplied to the chamber at one side or the other thereof, I shall hereinafter refer to the two sides thereof as the "leading side" and the "trailing side." The leading side shall be understood to be the side toward which the piston is moving, and the trailing side that away from which it is moving. Thus with the piston reciprocating a given side is at one time the leading side (if the piston is moving in the direction of that side) and at another time the trailing side (when the piston is moving away from that side).

The operation of the reversing valve 17 to alternately supply and exhaust steam to and from the opposite trailing sides of the power piston 9 may be controlled by any suitable valve gear. For example the valve gear may be of the conventional type which embodies a combination lever 35 disposed in a vertical position and provided intermediate its ends with a pivotal connection with the outer end of the reversing valve rod 21. The lower end of the combination lever 35 is connected to one end of a link 36 the opposite end of which is connected to the fulcrum connection between the cross-head 11 and main rod 15. The opposite end of the combination lever 35 is connected to one end of a radius rod 37 the opposite end of which is connected to a reverse link 38 through the medium of the usual link block (not shown) which is slidable in a slot 39 in said link in the usual manner. The link 38 is fulcrumed intermediate the ends of the slot 39 on any suitable stationary part of the locomotive such as the frame and the lower end thereof is connected by an eccentric rod 40 to one end of an eccentric crank 41 the other end of which is secured to turn with the crank pin 14 secured to the center driver wheel 6.

In Fig. 1 the radius rod 37 is shown connected to the link 38 midway between the ends of the slot 39 in which position no steam is adapted to be supplied to the steam cylinder 81 for driving the locomotive. When the radius rod 37 is rocked so that its end is connected to the link 38 at the lower end of the slot 39 the reversing valve is adapted to be conditioned to so control the supply of steam to the opposite sides of the steam piston 9 as to cause the locomotive to move forwardly. When the radius rod 37 is connected to the opposite end of slot 39 the reversing valve is adapted to be conditioned to cause the locomotive to back-up.

For thus conditioning the radius rod 37 it is connected intermediate its ends to one end of a lifting link 42 the opposite end of which is connected to one arm of a bell crank 43. The bell crank 43 is pivoted at its knee on a reverse shaft 44 while its opposite end is connected to one end of a rod 45 of a power reverse gear 46. The power reverse gear may be of any conventional structure adapted to be controlled through the medium of a rod 47 from a reversing lever 48 located in the cab 5 of the locomotive convenient for operation by the engineer. The reversing lever 48 is shown in the position for conditioning the power reverse gear 46 to connect the radius rod 37 with the link 38 intermediate the ends of the slot 39. The reversing lever 48 is adapted to be moved from the position shown to a position indicated by a dotted line 49 to effect operation of the power reverse gear 46 to drop the end of the radius rod 37 in the slot 39 in the reverse link 38 so as to condition the reversing valve for effecting movement of the locomotive in a forward direction. The reverse lever 48 is also adapted to be moved from the position shown to a position such as indicated by a dotted line 50 to thereby effect operation of the power reverse gear 46 to raise the end of the radius rod in the slot 39 in link 38 to thereby condition the reversing valve for effecting movement of the locomotive in a backwardly direction.

It is understood that in practice the reversing lever 48 operates relative to a quadrant (not shown) which is provided with a plurality of notches for defining various positions between the position indicated by the lines 49 and 50 to secure different cut-offs of the reversing valve within the steam chest. These various positions and the quadrant are however of no material importance in connection with the present invention, and have therefore been omitted. Furthermore, the construction and operation of the various parts of a steam locomotive such as have been described and are shown in the drawings are so well understood that a further showing and description thereof are not deemed essential to a comprehensive understanding of the present invention.

According to the invention, a reservoir 51 of selected volume with respect to the displacement of the steam piston 9 is mounted preferably on one side of the locomotive boiler 1. This reservoir is connected through a bore 55, a cavity 53 and a steam supply pipe 52 to the steam dome 2 on the locomotive boiler. A valve 54 in the cavity 53 is arranged to normally close communication between the steam dome 2 and reservoir 51 and is operative when unseated to allow steam to flow from the boiler to said reservoir for charging same. For controlling the opening and closing of valve 54 a piston 56 is provided which has at one side a pressure chamber 57 and at the opposite side a chamber 58 which is in permanent communication with the atmosphere through a breather port 59. A piston 60 of smaller diameter than piston 56 projects therefrom through chamber 58 into bore 55.

Also associated with the reservoir 51 is another piston 61 having at one side a pressure chamber 62 to which the chamber 57 is open, both of said chambers being connected to a brake control pipe 63. At the opposite side of piston 61 is a chamber 64 which is open to the atmosphere through a breather port 65 and which contains a spring 66 acting on the piston for urging it to its normal position shown in the drawings. The piston 61 is provided with a rod 67 extending through the chamber 64 and a suitable bore in the reservoir 51 to the interior thereof, the end of said rod being aligned with the end of the stem of a poppet valve 68 which is contained in a chamber 69 open to passage 27 through which steam is normally adapted to be supplied to the reversing valve and thereby the steam cylinder 8 upon operation of the engineer's throttle. The valve 68 is arranged to control communication between the reservoir 51 and thereby chamber 69 and the steam supply passage 27 and in said chamber is a spring 70 acting on said valve for urging same to its closed position for closing said communication. When the valve 68 is in its closed position the piston rod 67 is in substantial engagement therewith so that upon movement of the piston 61 in the direction of the right-hand from the position shown said piston is adapted to unseat said valve.

The brake control pipe 63 is connected to an engineer's brake valve device 72 located in the cab 5. This brake valve device, which may control braking of the locomotive only, is adapted to supply fluid under pressure to the pipe 63 for effecting such braking to a degree dependent upon the pressure of such fluid. Preferably, the brake valve device 72 is of the conventional automatic self-lapping type adapted to automatically vary the pressure in the pipe 63 in accordance with the position of an operating handle 73 in a brake application and release zone whereby upon operation of the handle 73 from the usual release position in which the pipe 63 will be vented fluid will be supplied to said pipe to a pressure corresponding to the position of said handle in said zone while upon movement of said handle in the reverse direction the pressure in said pipe will be correspondingly reduced.

Connected to the pipe 63 and arranged to automatically effect movement of the reversing lever 48 from its forward position indicated by line 49 to its reverse position indicated by line 50 is a reversing cylinder 75. This cylinder comprises a casing containing a piston 76 having at one side a pressure chamber 77 connected to the pipe 63 and having at the opposite side a non-pressure chamber 78 containing a spring 79 acting on the piston for urging same to its normal position shown. The piston 76 has a stem 80 projecting through the non-pressure chamber 78 to a point beyond the outside of the casing in operating alignment with the reverse lever 48. When the piston 76 is in its normal position shown, the rod 80 is adapted to be substantially engaged by the reverse lever 48 when in its maximum forward position. The travel of the piston 76 in the reversing cylinder is adapted to be sufficient to move the reversing lever 48 from its extreme forward position indicated by the dotted line 49 to its reversing position indicated by the dotted line 50. Normally, the brake control pipe 63 and thus the pressure chamber 77 in the reversing cylinder are both at atmospheric pressure through operation of the brake valve device 72. Under this condition the spring 79 maintains the reversing piston 76 in the position shown so as to thereby provide for usual operation of the reversing lever 48 by the engineer.

In the steam chest a valve 85 is provided for controlling the exhaust communication between the reversing valve chamber 23 and the exhaust passage 32 leading to the lower end of the smoke stack 4. This valve is normally open as shown in Fig. 2 to provide for conventional operation of the locomotive but is adapted to be moved by a piston 86 to a position for closing communication between chamber 23 and exhaust passage 32. The piston 86 has at its outer face a pressure chamber 87 connected by a passage 88 and a pipe 89 to a passage 90 in the reservoir 51, the passage 90 being connected to the brake control pipe 63. At the opposite side of piston 86 is a chamber 91 which is in constant communication with the atmosphere through a breather port 92 and which contains a spring 93 acting on said piston for normally urging it to the position shown. The piston 86 has a stem 94 extending through the chamber 91 and a suitable bore in the closed inner end thereof and carries on its outer end the valve 85. With the piston 86 held in the position shown by the spring 93 the stem 94 is adapted to maintain the valve 81 in the open position also shown.

Associated with the reservoir 51 is a pressure limiting device 95 which comprises a piston 96 having at one side a chamber 97 communicating with passage 90 and having at the opposite side a chamber 98 which is open to the atmosphere through an exhaust port 99. The piston 96 has a stem 100 projecting into chamber 98 and on the end of the stem is a valve 101 provided for controlling communication between the reservoir and the atmosphere by way of chamber 98 and the exhaust port 99.

*Operation*

Let it be assumed that the reverse lever 48 is in its neutral position, as shown, and that the reversing valve 17 is thus conditioned by operation of the power reverse gear 46 and the reverse gear mechanism controlled thereby to lap both of the steam supply ports 28 and 29 leading to opposite faces of piston 9 in the steam cylinder 8. Let it further be assumed that the brake valve device 72 is conditioned so as to release fluid under pressure from the brake control pipe 63 and thereby from the piston chambers 57, 62, 87 and 97 under which condition the steam supply valves 54 and 68 will be closed, the exhaust closing valve 85 will be open and the piston 96 will be balanced as to opposing fluid pressures which however is immaterial at this time.

If the engineer now desires to cause the locomotive to move forward under power, he moves the reversing lever 49 from the neutral position shown to the forward position indicated by the dotted line 49, and this operation causes the power reverse gear 46 to operate in the usual manner to rock the radius rod 37 in a counter-clockwise direction about its pivotal connection with the combination lever 35. The connection between the radius rod 37 and link 38 is thus lowered to the lower end of the slot 39 in said link, and as a result the reversing valve 17 is conditioned to open passage 29 to the annular chamber 24 between the reversing valve pistons 18 and 19, and at the same time chamber 30 at the opposite side of piston 9 is opened to the exhaust passage 32 through passage 28 and chamber 22. The engineer then operates the usual throttle device to supply steam from the boiler 1 to the steam chest by way of the steam supply passage 27, cavity 26, and port 25 which opens to the annular chamber 24 formed between the reversing valve pistons 18 and 19. Since the annular chamber 24 is at this time open to the passage 29, steam will thus be supplied to chamber 31 in front of or at the trailing side of piston 9 and act thereon to move same in the direction toward the rear of the cylinder 8. This movement of piston 9 transferred through the piston rod 10, cross-head 11 and the main rod 15, is applied to the side rod 13 and causes the driver wheels 6 to turn in a clockwise direction for thereby moving the locomotive forward. After the locomotive is thus started, the operation of the reversing valve 17 by the reverse gear alternately supplies steam to and then vents steam from first chamber 31 and then chamber 30 at the trailing side of the steam piston 9 for causing same to reciprocate to turn the driver wheels 6 in the well known manner.

If while the locomotive is thus moving forwardly, the engineer desires to employ the steam piston 9 for braking the driver wheels 6, he first operates the throttle to cut off the supply of steam to the steam supply passage 27, and thereby to the steam cylinder 8, and then operates the brake valve device 72 to supply air at a desired pressure to pipe 63 from any suitable source such as the usual main reservoir on the locomotive. The air or fluid under pressure thus supplied to pipe 63 flows to chamber 77 in the reversing cylinder 75 and therein acts on the piston 76 to move same in the direction of the left-hand against the opposing pressure of the spring 79. This operation of piston 76 acts through the stem 80 to move the reverse lever 48 from its forward position, indicated by the dotted line 49, to its reversing position indicated by the dotted line 50. This movement of the reversing lever 48 automatically acts through the power reverse gear 46 to shift the connection between the radius rod 37 and link 38 to the upper end of the slot 39 in said link to thereby condition the reversing valve 17 to operate in such a manner as to open and close the steam ports 28 and 29 in the steam cylinder 8 in the reverse order from that obtaining when moving forward under power, or in the order normally employed for backing the locomotive up under power.

The fluid under pressure supplied to the pipe 63 flows to the reservoir 51 and to piston chambers 57 and 62 associated therewith, and also through the passage 90 to piston chamber 97 and to pipe 89 which is connected with passage 88 leading to piston chamber 87 in the steam chest. The pressure of fluid thus obtained in the chamber 87 is adapted to promptly move the piston 86 in the direction of the left-hand for thereby operating the valve 85 to close communication between the reversing valve chamber 23 and the exhaust passage 32.

It will be noted that when the reversing valve 17 is operated in response to operation of the reversing cylinder 75 the chamber at the trailing side of the piston 9, which would be supplied with steam with the locomotive working under power, is opened through the reversing valve to the exhaust chambers 22 or 23, and reciprocation of said piston would therefore act to draw cinders from the smoke box 3 into the cylinder 8. This of course would be undesirable and one function of the closing valve 85 is to prevent such from occurring and said valve is therefore promptly closed upon operation of the brake valve device 72 as above described.

The fluid pressure supplied by the brake valve device 72 through the pipe 63 to piston chamber 57 in the reservoir 51 acts on the piston 56 for moving same in an upwardly direction to thereby unseat the steam supply valve 54. With the valve 54 thus unseated steam from the steam dome 2 is permitted to flow through the pipe 52 and cavity 53 past said valve to bore 55 and thus into the reservoir 51. The valve 101 is seated at this time by the action of fluid pressure supplied from the pipe 63 to chamber 97 and acting on the piston 96 as will be apparent. The pressure of the steam thus supplied to the reservoir 51 acts in bore 55 on piston 60 in opposition to the pressure of fluid supplied to chamber 57 by the brake valve device and acting on the piston 56 and when the pressure of steam in the reservoir 51 is increased to a degree sufficient to overcome the opposing air pressure in chamber 57 the piston 60 and thereby the piston 56 move in a downward direction which permits closing of the valve 54 to thus cut off the further supply of steam to reservoir 51.

The area of the piston 56 is preferably relatively large as compared to that of the piston 60 so that a relatively low air pressure supplied to the pipe 63 by operation of the brake valve device 72 will provide for charging of the reservoir 51 with steam at a relatively high pressure. The areas of these pistons may be so related that a maximum air pressure obtainable in pipe 63, of for instance forty five pounds, by operation of the brake valve device 72 will provide full boiler pressure in the reservoir 51. The brake valve device 72 is however operative to supply any degree of air pressure to the pipe 63, as hereinbefore mentioned and the pistons 56 and 60 will therefore operate to limit the steam pressure obtained in the reservoir 51 to a proportionate degree.

At substantially the same time as the valve 54 is operated to supply steam to the reservoir 51 the air pressure supplied to piston chamber 62 to act on the piston 61 effects movement thereof against the opposing pressure of spring 66 to thereby operate the rod 67 to unseat the valve 68. At this time the throttle is closed and no steam is supplied thereby to the steam supply passage 27 in the steam chest as hereinbefore mentioned. However upon opening of the valve 68 by operation of the piston 62 steam supplied to the reservoir 51 past the valve 54 is permitted to flow from said reservoir through the cavity 69 to the steam supply passage 27 and thence through cavity 26 and port 25 to the annular space 24 provided around the reversing valve 17 between the pistons 18 and 19.

Assuming that at the instant the valve 68 is opened to supply steam from the reservoir 51 to the reversing valve chamber 24 the drive connection between the piston 9 and the driver wheels 6 occupies the position shown in Fig. 1, said piston will be moving toward the rear end of the cylinder 8. With the reversing valve 17 conditioned for reverse operation by operation of the reversing cylinder 75 as hereinbefore described, said reversing valve will therefore be establishing communication between the annular chamber 24 and passage 28 leading to the rear or leading face of the steam piston 9. Steam from the reservoir 51 will therefore flow through the reversing valve chamber 24 to chamber 30 at the rear or leading face of the steam piston 9 and act thereon to oppose movement of said piston and thereby forward rotation of the driver wheels 6, or in other words will be effective to brake said wheels. At the same time as steam is thus acting in chamber 30 for opposing movement of piston 9, chamber 31 at the opposite side of the piston is open to the reversing valve chamber 23. The exhaust closing valve 85 is however seated at this time so that movement of the steam piston 9 toward the rear of its cylinder 8 draws a partial vacuum in the chamber 31. This increases the differential of fluid pressures acting on the opposite faces of the piston 9 so as to further oppose movement thereof toward the rear of the cylinder 8 by the driver wheels 6 due to forward movement of the locomotive.

As the piston 9 moves toward the rear end of the cylinder 8 the chamber 30 will be filled with steam from the reservoir 51 through the reversing valve 17 as just mentioned and the movement of the piston will therefore act to displace a portion of the steam back through the passage 28 and the reversing valve into the reservoir 51 due to the open connection between the chamber 30 and said reservoir, so that the pressure in said chamber which provides braking of the driver wheels will be maintained substantially equal to the selected pressure of steam in said reservoir. Before the piston 9 reaches the end of its stroke, the reversing valve 17 will be operated in the usual way to first lap the steam supply passage 28 and thus close communication between the chamber 30 and reservoir 51 and to then open said chamber to the reversing valve chamber 22. During the cut off period in which the passage 28 is lapped, the pressure of steam in chamber 30 would tend to increase due to the continued movement or displacement of the piston and thus increase the degree which the driver wheels 9 would be braked. With the reverse lever 48 in the full reverse position the cut-off travel of the reversing valve 17 is relatively short and the increase in steam pressure in chamber 30 obtained during the cut-off period might therefore not be objectionable under certain conditions. Such an increase is however avoided in the present embodiment of the invention by connecting the passage 28 past a check valve 102 to cavity 26, so that the pressure in chamber 30 will not increase to any material extent over the desired pressure acting in reservoir 51. The valve 102 normally closes communication between chamber 30 and cavity 26 so as to thereby prevent flow of steam to said chamber and thus avoid interference with either propulsion or braking of the locomotive.

At the time the steam piston 9 reaches the rear of cylinder 8 and is thereby ready to start movement in the direction toward the forward end of the cylinder 8, the chamber 30 is opened through passage 28 to the reversing valve chamber 22, as above mentioned, while the chamber 31 is opened through passage 29 to the annular chamber 24 between the reversing valve pistons 18 and 19, which annular chamber is supplied with steam under pressure from the reservoir 51 through the valve 68. The pressure of steam thus supplied to chamber 31 therefore acts on piston 9 to oppose movement of said piston in a forwardly direction by the driver wheels 6 so as to thereby brake said wheels. Upon slight movement of the piston 9 away from the rear end of the cylinder 8 the pressure of the steam remaining in chamber 30 at the completion of the rearward stroke of said piston will become reduced and as the piston continues to move forward in the cylinder 8 a partial vacuum will be produced in chamber 30 and increase the force or differential of pressures acting on the opposite faces of said piston opposing forward movement thereof by the driver wheels 6 to thereby increase the degree of braking of said wheels. When during the forward movement of piston 9 the reversing valve 17 laps passage 29, a check valve 104 becomes effective to limit the pressure at the leading side of the piston in the same manner as the check valve 102 when said piston was moving toward the rear of cylinder 8.

In the manner just described the reversing valve 17 will be conditioned by the usual reverse gear to supply steam first to one leading side of the piston 9 and then to the opposite leading side and to provide for the producing of a partial vacuum at the face opposite that subjected to steam pressure, in the reverse order employed for propelling the locomotive so to thereby oppose forward rotation of the driver wheels 6, or in other words so as to brake the locomotive.

The degree of braking thus obtained is adapted to be varied in accordance with the operation of the brake valve device 72 and thereby the pressure of fluid supplied to pipe 63, which determines the pressure of steam obtainable in reservoir 51.

It will be noted that as the steam piston 9 is caused to reciprocate in cylinder 8 to provide braking of the locomotive, the used steam ahead of the steam piston 9 is exhausted back into the reservoir 51. In other words, steam is first taken from said reservoir to fill the space at the leading side of the steam piston 9 and then as said piston is operated against said steam, the steam is exhausted or pushed back from the front of the piston into said reservoir. Steam from the reservoir is thus first applied to one leading side of the piston 9 and pushed back into said reservoir and then applied to the opposite leading face of the piston and subsequently pushed back into the reservoir thereby providing substantially a closed system in which the steam is used over and over again to provide braking of the locomotive.

This shuttling of the steam back and forth between the reservoir 51 and the steam cylinder 8 may of course result in a certain degree of super-heating with a consequent tendency for increasing the pressure of steam in the reservoir. Such increase however above the desired selected pressure is avoided due to the fact that the steam pressure in reservoir 51 acts on the valve 101 and when increased above the desired degree called for by the pressure of compressed air acting in chamber 97 on piston 96 the valve 101 will be unseated so as to dissipate steam from the reservoir through the cavity 98 and port 99 to the atmosphere. When the steam pressure in the reservoir 51 is thus reduced to the degree called for by the selected air pressure acting in chamber 97 on piston 96, said air pressure actuates said piston to seat the valve 101. The pressure of steam in the reservoir employed for braking can thus not increase above that called for by operation of the brake valve device 72.

In order to maintain the temperature of the steam at a relatively low degree and thereby avoid excessive loss past the limiting valve 101 as just mentioned, the reservoir 51 may be provided with any suitable means such as vertically arranged cooling pipes 103 for dissipating heat therefrom. These pipes, as shown in the drawings, may extend vertically through the reservoir 51 from the bottom to the top thereof and be open at the opposite ends to the atmosphere.

If the pressure of steam in the reservoir 51 tends to reduce for any reason, due for instance to leakage in any part of the mechanism, the air pressure acting on the piston 56 will unseat the valve 54 to replenish the supply of steam in the reservoir to the pressure called for the pressure of air acting on said piston. The pressure in said reservoir will thus be maintained substantially within desired limits to provide the desired degree of braking of the locomotive.

In order to obtain the closed system in which the steam is merely shuttled back and forth between the reservoir 51 and the steam cylinder 8, the piston 96 and valve 101 are preferably so related as to operate only at a steam pressure somewhat exceeding that at which the supply valve 54 is closed. In other words, let it be assumed that the supply valve 54 will close when the steam pressure obtained in the reservoir 51 and in the chamber at one side of the steam piston 9 is built up to a desired degree. Displacement of steam from the steam cylinder 9 back into the reservoir 51 will then increase the pressure therein, not considering any increase in temperature, but it is not intended that the relief valve 101 shall open due to such increase. Not considering leakage of steam therefore, the reservoir will have to be charged with steam to the desired pressure only at the time the application of brakes is initiated and such steam will then provide for braking during the entire braking period.

The increase in steam pressure in reservoir 51 incident to displacement of the steam piston 9 is a function of the volume of the reservoir 51 with respect to the displacement of piston 9 and may be limited to any desired degree, as will be apparent.

When the engineer desires to terminate braking of the locomotive, he operates the brake valve device 72 in the usual manner to release the fluid under pressure from pipe 63 and thereby from piston chambers 62, 57 and 97 in the reservoir 51 and from piston chamber 87 in the steam chest. The venting of fluid under pressure from the piston chamber 57 permits closing of the valve 54, unless already closed, to thereby prevent further supply of steam to the reservoir 51. The venting of fluid under pressure from piston chamber 62 permits the spring 66 to return the piston 61 to its normal position so as to thereby permit spring 70 to seat the valve 68 and thus close communication between the reservoir and the steam supply passage 27, while the venting of fluid under pressure from piston chamber 97 permits the pressure of steam in the reservoir acting on the valve 101 to unseat said valve so that the steam in said reservoir previously employed for braking purposes will be dissipated to the atmosphere through the exhaust port 99 and thus not condense in the reservoir while the locomotive is not being braked. The venting of fluid under pressure from the piston chamber 87 permits spring 93 to return said piston to the position shown for thereby shifting the exhaust closing valve 85 to its open position.

With the brakes on the locomotive thus released, if the engineer again desires to apply power to the locomotive for propelling same in a forwardly direction, he shifts the reverse lever 48 from its reverse position employed during braking and indicated by the dotted line 50 to its forward position indicated by the dotted line 49, to thereby recondition the power reverse gear 46 and reversing valve 17 for forward movement of the locomotive under power, and then operates the usual throttle to supply steam to the steam supply passage 27. The locomotive is then driven forward under power in the usual manner.

*Description of embodiment shown in Fig. 3*

Figure 1:
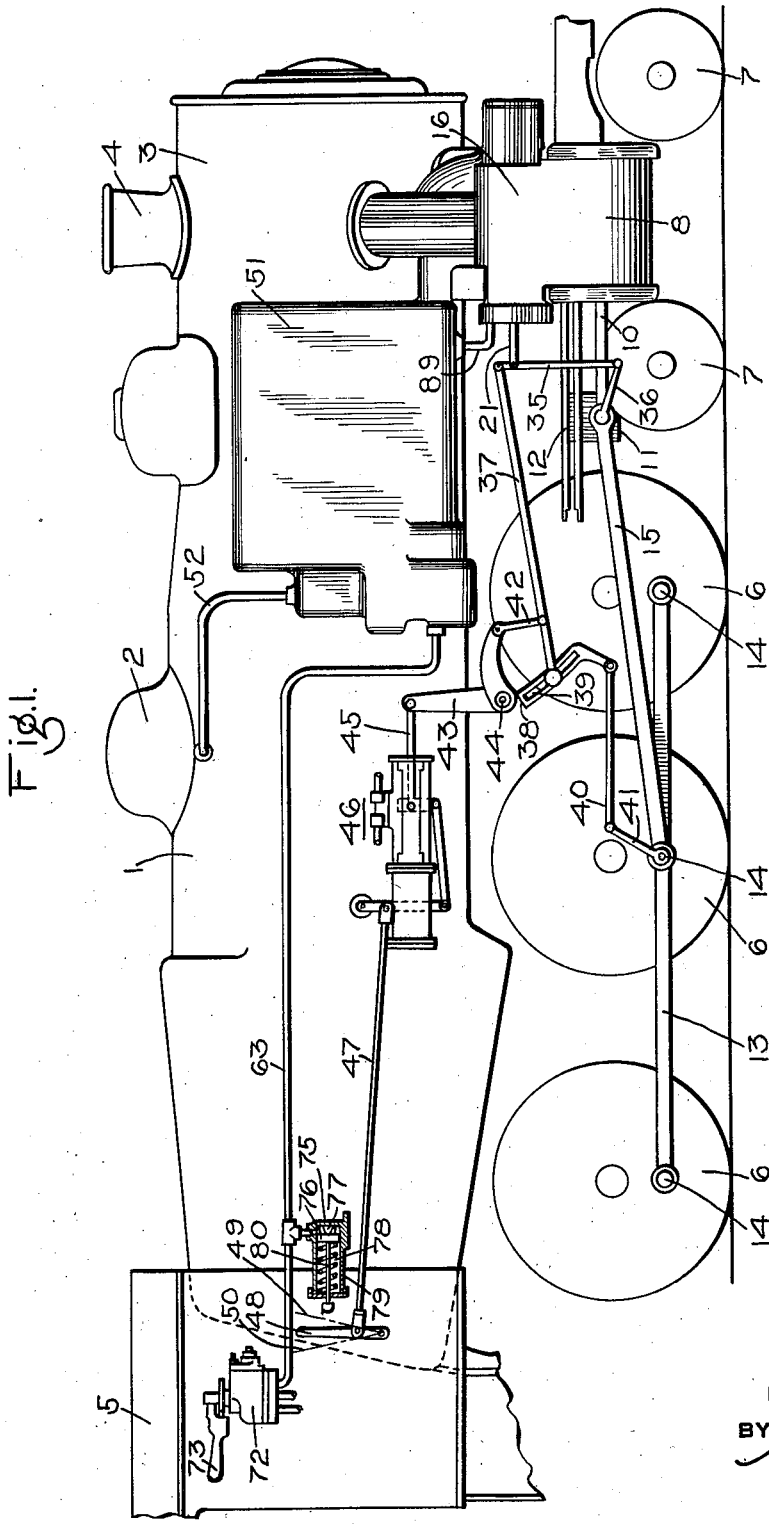

This embodiment of the invention is relatively simple as compared to the embodiment shown in Figs. 1 and 2 and above described, in that there is no need for reversing the reversing valve 17 at the time it is desired to employ the steam piston 9 for braking purposes. Furthermore, no reservoir 51 is provided for carrying a measured amount of steam and for receiving steam displaced by the piston during braking. A portion of the steam displaced by the piston 9 during braking is, in this embodiment, dissipated to the atmosphere so that this arrangement is not as economical as the arrangement shown in Fig. 2 but the relative simplicity may off-set such economy.

In this embodiment the valve 54 for supplying steam from pipe 52 supplies such steam directly to the valve 68 upon operation of the brake valve device 72. The valve 68 controls a communication between the valve 54 and a passage 115 leading directly to the reversing valve exhaust chamber 22.

A cylindrical valve 116 is provided for controlling communication between the reversing valve exhaust chamber 23 and the steam exhaust passage 32. This valve is connected for movement with a piston 117 having at its face opposite the valve 116 a chamber 118 which is connected by a passage 119 to the brake control pipe 63. At the opposite side of piston 117 is a chamber 120 through which the valve 116 operates, and encircling said valve and bearing against said piston is a coil spring 121 which acts on the piston for urging same to its normal position shown.

The cylindrical valve 116 is adapted to enter a bore 122 for closing communication between the reversing valve exhaust chamber 23 and the usual exhaust passage 32 and said valve is provided adjacent the piston with a plurality of ports 123 adapted to connect the interior of the valve and thereby chamber 23 to the chamber 120.

The pressure limiting valve device 95 is in this embodiment associated with the steam chest and comprises the piston 96 and valve 101 connected with the piston for movement therewith. The piston 96 is open at one face to the chamber 97 which is connected to passage 119. The stem 100 connecting the piston 96 to the valve 101 is slidable through a suitable bore provided in a wall between the piston and valve, and separating a chamber 124 at the side of piston 96 opposite chamber 97 from a chamber 125. The chamber 124 is in constant communication with the atmosphere through a vent passage 126. The chamber 125 is open to the exhaust passage 32 and the valve 101 is arranged to control communication between the chamber 125 and a passage 127 which leads to the spring chamber 120.

*Operation of embodiment shown in Fig. 3*

In operation, when the brake valve device 72 is in its release position where it vents the brake control pipe 63, the valves 54 and 68 will both be seated and spring 121 acting on piston 127 will maintain said piston and thereby the valve 126 in the position shown, so that the reversing valve chamber 23 will be open to the exhaust passage 32. With the parts thus conditioned, when the engineer operates the usual throttle to supply steam to passage 27 and thus to the reversing valve 17, said valve will operate to supply such steam first to one side and then to the opposite side of the piston 9 for operating same to effect rotation of the driver wheels 6 to propel the locomotive in a forwardly direction, assuming the reversing lever 48 to be in its forward position.

When the engineer desires to brake the locomotive through the medium of the driving piston 9, he operates the throttle to cut off the supply of steam to the steam supply pipe 27 and moves the reversing lever 48 to its full forward position indicated by the dotted line 49, unless said lever already occupies such position. He then operates the brake valve device 72 to supply fluid to the pipe 63 at a pressure required to obtain a desired degree of braking. The fluid pressure thus supplied to pipe 63 flows to piston chamber 118 and therein acting on the piston 117 moves the cylindrical valve 116 into the bore 122 for thereby closing communication between the reversing valve chamber 23 and usual exhaust passage 32, said chamber then being opened through said valve and the ports 123 therein and passage 127 to the lower face of the pressure limiting valve 101. The pressure of fluid supplied to pipe 63 also actuates the piston 56 to unseat the supply valve 54 to supply steam at a selected pressure to the valve 68. The valve 68 is also unseated to piston 62 so that the steam supplied thereto is permitted to flow through the passage 115 to the reversing valve exhaust chamber 22.

Now let it be assumed that at the instant the usual steam throttle is operated to cut off the supply of steam to the passage 27 and the brake valve device 72 is operated to cause braking of the locomotive the reversing valve 17 occupies a position in which the annular cavity 24 connects the passage 29 leading to chamber 31 ahead of the piston 9 to the supply pipe 27. With the reversing valve thus conditioned the steam supplied to the reversing valve exhaust chamber 22 past valve 68 flows through the passage 28 to chamber 30 and therein acts to oppose movement of piston 9 with the wheels 6 as they turn forward, to thereby provide braking of said wheels. In other words, in this embodiment of the invention braking is obtained by supplying steam to the reversing valve exhaust chambers which does not require that the reversing valve means be conditioned for reversing the locomotive as in the embodiment above described.

When steam is supplied to the piston chamber 30 to oppose rearward movement of the steam piston 9, chamber 31 at the opposite side of the piston will be open through the annular cavity 24 provided between the reversing valve pistons 18 and 19 to the steam supply passage 27. With the throttle closed however there will be no supply of steam to the passage 27 so that after a slight movement of the steam piston 9 in the direction of the rear end of the cylinder 8 said piston will act to draw a partial vacuum in the chamber 31 to thereby increase the differential of the pressures acting on the piston 9 for opposing rotation of the driver wheels 6. This partial vacuum is adapted to increase the degree of braking of the driver wheels over that obtainable by the pressure of steam only, as in the embodiment before described.

During braking the chamber 30 at the braking or leading side of the steam piston 9 will be filled with steam at the desired pressure past the valve 68 at substantially the time said piston begins its stroke so that during subsequent movement of the piston there will be a displacement of steam back into the reversing valve chamber 22. Such displacement in this embodiment of the invention is not adapted to be absorbed as by the reservoir 51 in the embodiment shown in Fig. 2, but an increase in pressure above a desired degree in the chamber 22 resulting from such displacement is prevented by operation of the pressure limiting valve device 95, since it will be noted that during braking the reversing valve chambers 22 and 23 are connected through the cylindrical valve 116 to the lower face of the valve 101. With this connection when the pressure acting on the piston 9 for braking is increased to the desired degree determined by the pressure by air supplied to chamber 97 and acting on the piston 96 the valve 101 will be unseated to thereby open a vent for preventing a further increase in pressure in the reversing valve exhaust chambers and in the chamber at the braking face of the steam piston 9.

When the reversing valve 17 obtains its cut-off position closing communication between chamber 22 and the chamber 30 at the braking face of the piston 9 the continued movement of the piston during the cut-off period will increase the pressure at the braking face of the piston to a certain degree, but promptly following the cut-off this increase will be dissipated through the annular cavity 24 between the reversing valve pistons 18 and 19 and port 25 into the steam supply passage 27. In this embodiment no means such as the check valves 102 and 104 are provided for limiting the pressure of steam on the braking face of the piston during the cut-off period of the reversing valve and, for the sake of simplicity and due to the fact that the cut-off period is relatively short with the reverse lever 48 in the full forward position such omission is considered permissible with the proper design and proportioning of various other parts of the mechanism.

When the reversing valve 17 is operated to reverse the connections in the steam chest so as to open the steam piston chamber 31 to the reversing valve chamber 23 then steam supplied past the valve 68 will flow to the chamber 31 to oppose forward movement of the piston 9 and after a certain degree of such movement a partial vacuum will be drawn in chamber 30 at the opposite side of said piston to thereby provide for braking of the driver wheels 6 in the same manner as when the piston 9 is moved in the opposite direction, as above described. Thus upon reciprocation of the piston 9 in cylinder 8 it will be alternately subjected on opposite faces to either steam pressure or partial vacuum for applying force to the driver wheels 6 to oppose rotation thereof during forward movement of the locomotive. The degree of braking thus obtained may be varied in accordance with the operation of the brake valve device 72 in the same manner as obtained in the embodiment shown in Fig. 2.

When it is desired to terminate braking, the engineer operates the brake valve device 72 to release fluid under pressure from the pipe 63 and thereby from the piston chambers 57 and 62 so as to thus cut-off the supply of steam to the reversing valve chamber 22. At the same time the venting of fluid under pressure from the brake control pipe 63 also results in a corresponding venting from piston chamber 118 which permits spring 121 to return piston 117 and thereby the cylindrical valve 116 to their normal positions shown so as to thereby open the reversing valve chamber 23 to the usual exhaust passage 32. The parts of the locomotive are now in condition for causing the locomotive to be moved under power when the engineer desires to operate the throttle for again supplying steam from the boiler to the passage 27.

Summary

It will now be apparent that by the use of the invention the pistons employed on steam locomotives for the purpose of propulsion may also be used for braking. The degree of such braking may be varied from a maximum obtainable by the use of full boiler pressure plus vacuum on the opposite faces of the piston to any lesser degree desired. By the use of full boiler pressure, if desired, on the driver pistons braking forces at least equal to the tractive effort of the locomotive are obtainable whereby the locomotive will be capable of braking any train down a grade which it can haul up the same grade. By the use of either form of the invention heating and loosening of the driver wheel tires is avoided as well as excessive wear thereof such as is obtained in conventional brake systems due to frictional contact with brake shoes. Both forms of the invention are adapted to accomplish the same end, the form shown in Fig. 1 being more economical in the use of steam for braking purposes which however is offset in the mechanism shown in Fig. 3 by its relative simplicity.

While only two embodiments of the invention have been shown and described in detail it is not the intention to limit the scope to these embodiments or otherwise than by the terms of the appended claims.

Having now described our invention, what we claim as new and desire to secure by Letters Patent, is:

1. A brake arrangement for a driver wheel of a steam locomotive having a reciprocatory piston connected to said wheel and operative by steam alternately supplied first to one trailing side of the piston and then to the opposite trailing side when steam is vented from the leading side of the piston to effect rotation of said wheel for propelling said locomotive, and reversing valve means operative automatically in accordance with the reciprocation of said piston to effect said alternate supply of steam to and the venting of the opposite faces of said piston, said brake arrangement comprising brake control means cooperative with said reversing valve means to reverse the order of steam supply to the opposite faces of said piston and to close the vent from the side of said piston opposite that to which steam is supplied to thereby render said piston operative to oppose rotation of said wheel, and a brake device controlled by the engineer for cutting said brake control means either into or out of operation.

2. A brake arrangement for a driver wheel of a locomotive comprising a power cylinder, a piston therein adapted to be reciprocated by the application of steam pressure from the locomotive boiler first to one trailing face and then to the opposite face for turning said wheel, a brake controlling device operative to effect a supply of steam from said boiler for acting first on one leading face and then on the opposite face of said piston for opposing reciprocation thereof by said wheel, reversing valve means operative in accordance with the reciprocation of said piston to normally control the supply of steam from said boiler to said piston for turning said wheel and cooperative with said brake controlling device upon operation thereof to control the supply of steam to said piston for opposing turning of said wheel, and means operative to limit the pressure of steam opposing rotation of said wheel to a degree independent of the pressure of steam in said boiler.

3. A brake arrangement for a driver wheel of a locomotive comprising a power cylinder, a piston therein adapted to be reciprocated by the application of steam pressure first to one trailing face and then to the opposite face for turning said wheel, a brake controlling device operative to effect a supply of steam for acting first on one leading face and then on the opposite face of said piston for opposing reciprocation thereof by said wheel, and reversing valve means operative in accordance with the reciprocation of said piston to normally control the supply of steam to said piston for turning said wheel and cooperative with said brake controlling device upon operation thereof to control the supply of steam to said piston for opposing turning of said wheel, and means operative upon movement of said piston against the pressure of steam supplied in response to operation of said brake controlling device to limit to a desired degree the increase in such pressure incident to such movement of said piston.

4. A brake arrangement for a driver wheel of a locomotive comprising a power cylinder, a piston therein adapted to be reciprocated by the application of steam first to one face and then to the opposite face for turning said wheel, a brake valve device having a brake release position and movable therefrom to supply fluid at any selected pressure, means operative by the fluid pressure supplied by said brake valve device to supply steam at a proportional pressure for acting first on one and then the other of the opposite faces of said piston to oppose movement thereof by said wheel, reversing valve means conditionable in accordance with the reciprocation of said piston and operative when said brake valve device is in said brake release position to control the supply of steam to the opposite faces of said piston for turning said wheel, means conditionable upon movement of said brake valve device from said release position to cooperate with said reversing valve means for controlling the supply of steam in response to said operation of said brake valve device to the opposite sides of said pistons in such an order as to oppose movement thereof by said wheel, and means controlled by the opposing pressures of fluid supplied by said brake valve device and of steam supplied in response to operation of said brake valve device for limiting the pressure of steam acting on said piston for opposing movement thereof to a degree proportional to the pressure of said fluid.

5. A brake arrangement for a driver wheel of a steam locomotive having a steam cylinder, a reciprocatory piston in said cylinder connected to said wheel and reversing valve means operative automatically in accordance with reciprocation of said piston to alternately supply steam first to one side and then to the opposite side of said piston for actuating same to turn said wheel, said brake arrangement comprising a brake control pipe, brake valve means operative manually to effect various degrees of variation in pressure in said pipe, steam supply means operative in accordance with the pressure in said pipe to supply steam at a proportional pressure, and other means operative in response to variations in pressure in said pipe and cooperative with said reversing valve means to supply steam from said steam supply means first to one and then to the opposite face of said piston in such an order as to oppose reciprocation of said piston to thereby brake said wheel.

6. A brake arrangement for a driver wheel of a steam locomotive having a steam cylinder, a reciprocatory piston in said cylinder connected to said wheel, and reversing valve means normally operative automatically in accordance with the reciprocation of said piston to alternately supply steam first to one trailing face of said piston and then to the opposite face for actuating said piston to turn said wheel, said brake arrangement comprising brake control means cooperative with said reversing valve means to reverse the order of steam supply to the opposite faces of said piston for thereby opposing movement of said piston so as to brake said wheel, pressure limiting means subject to the pressure acting on said piston opposing movement thereof and operative to limit the degree of such pressure to a desired amount, and manually operative means for cutting said brake control means and pressure limiting means into and out of operation.

7. A brake arrangement for a driver wheel of a steam locomotive having a steam cylinder, a reciprocatory piston in said cylinder connected to said wheel, and reversing valve means operative automatically in accordance with the reciprocation of said piston to alternately supply steam first to one face of said piston and then to the opposite face for actuating said piston to turn said wheel, said brake arrangement comprising a brake control pipe, brake valve means operative manually to effect various degrees of variation in pressure in said pipe, steam supply means operative in accordance with the pressure in said pipe to supply steam at a proportional pressure, other means operative in response to the variation in pressure in said pipe and cooperative with said reversing valve means to supply steam from said steam supply means first to one side of said piston and then to the opposite side in such an order as to oppose reciprocation of said piston so as to thereby brake said wheel, and pressure limiting means controlled by the opposing pressures in said pipe and the pressure of steam acting on said piston and opposing movement thereof and operative to limit the steam pressure on said piston to a degree proportional to the pressure in said pipe.

8. A brake arrangement for a driver wheel of a steam locomotive having a steam cylinder, a reciprocatory piston in said cylinder connected to said wheel, and reversing valve means operative automatically in accordance with the reciprocation of said piston to alternately supply steam first to one side of said piston and then to the opposite side for actuating said piston to turn said wheel, said brake arrangement comprising a brake control pipe, an engineer's brake valve device operative to supply fluid at various pressures to said pipe, and means cooperative with said reversing valve means upon supply of fluid under pressure to said pipe to supply steam at a pressure proportional to the pressure in said pipe first to one side of said piston and then to the opposite side in such an order as to oppose reciprocation of said piston so as to thereby brake said wheel.

9. A brake arrangement for a driver wheel of a steam locomotive having a steam cylinder, a reciprocatory piston in said cylinder connected to said wheel, a steam supply passage and reversing valve means operable automatically in accordance with reciprocation of said piston to connect first one side of said piston and then the opposite side to said steam supply passage and to open the side of the piston not connected to said passage to an exhaust in such an order that steam from said passage will act on said piston to propel said wheel, said brake arrangement comprising means controlled manually to effect a supply of steam, and means responsive to the operation of said manually controlled means and cooperative with said reversing valve means to close said exhaust and to supply steam provided by said manually controlled means first to one side of said piston and then to the opposite side in an order to oppose movement of said piston so as to brake said wheel.

10. A brake arrangement for a driver wheel of a steam locomotive having a steam cylinder, a reciprocatory piston in said cylinder connected to said wheel, a steam supply passage and reversing valve means operable automatically in accordance with reciprocation of said piston to connect first one side of said piston and then the opposite side to said steam supply passage and to open the side of the piston not connected to said passage to an exhaust in such an order that steam from said passage will act on said piston to propel said wheel, said brake arrangement comprising means controlled manually to effect a supply of steam, and means responsive to the operation of said manually controlled means and cooperative with said reversing valve means to close said exhaust and to supply steam provided by said manually operative means to said exhaust whereby with the supply of steam to said passage cut off said piston will be alternately subject on opposite faces to pressure in said passage and the pressure of steam supplied to said exhaust by said manually operative means in such a manner that the differentials of pressure on said piston will oppose movement thereof to thereby brake said wheel.

11. A brake arrangement for a driver wheel of a steam locomotive having a steam cylinder, a reciprocatory piston in said cylinder connected to said wheel, a steam passage through which steam is adapted to be supplied for propelling the locomotive, and reversing valve means normally conditionable in accordance with the direction which it is desired the locomotive shall move to supply steam from said passage alternately first to one side of said piston and then to the opposite side of said piston and to connect the side of the said piston not subject to steam to an exhaust in such an order as to actuate said piston to turn said wheel in the desired direction, said brake arrangement comprising means adapted to cooperate with said reversing valve means while the locomotive is in motion in one direction to effect closure of said exhaust and to supply steam alternately to the opposite faces of said piston in such an order as to oppose movement of said piston so as to thereby brake said wheel, and a manually controlled device arranged to control said means.

12. A brake arrangement for a driver wheel of a steam locomotive having a steam cylinder, a reciprocatory piston in said cylinder connected to said wheel, a steam passage to which steam is adapted to be supplied for propelling the locomotive, and reversing valve means normally conditionable in accordance with the direction which it is desired the locomotive shall move to supply steam from said passage first to one side of said piston and then to the opposite side in such an order as to actuate said piston to turn said wheel in the desired direction, said brake arrangement comprising means responsive to manual control to supply steam to a chamber, means operative upon the operation of the manually controlled means and cooperative with said reversing valve means to supply steam from said chamber first to one side of said piston and then to the opposite side in such an order as to oppose movement of said piston so as to brake said wheel, and one-way flow means connecting said cylinder at the opposite sides of said piston to said chamber providing for the flow of steam from said cylinder to said chamber.

13. A brake arrangement for a wheel of a locomotive comprising a power cylinder, a reciprocatory piston therein operative by the application of steam pressure first to one side and then to the opposite side to turn said wheel, a steam supply passage through which steam is adapted to be supplied for driving said piston, a brake valve device operative manually to effect a supply of steam for acting on said piston for opposing movement thereof, reversing valve means adjustable in accordance with the reciprocation of said piston and operative when said brake valve device is in a release position to control the steam supply from said passage to said piston for turning said wheel, and means cooperative with said reversing valve means upon movement of said brake valve device from said release position to supply steam provided in response to operation of said brake valve device to the opposite sides of said piston in such an order as to oppose movement of said piston by said wheel so as to thereby brake said wheel.

14. A brake arrangement for a wheel of a locomotive comprising a power cylinder, a reciprocatory piston therein operative by the application of steam first to one side and then to the opposite side of said piston to turn said wheel, a steam supply passage through which steam is adapted to be supplied for driving said piston, a reservoir of selected volume with respect to the displacement of said piston, a brake valve device having a release position and operative upon movement out of said release position to effect charging of said reservoir with steam, reversing valve means adjustable in accordance with reciprocation of said piston and operative when said brake valve device is in said release position to control the steam supply from said passage to said piston for turning said wheel, and means cooperative with said reversing valve means upon movement of said brake valve device out of said release position to open communication between said reservoir and said cylinder at the leading side of said piston in accordance with the direction of movement of said piston in said cylinder to thereby subject first one leading side and then the other to the pressure of steam in said reservoir for opposing reciprocation of said piston.

15. A brake arrangement for a wheel of a locomotive comprising a power cylinder, a reciprocatory piston therein operative by the application of steam first to one side and then to the opposite side of said piston to turn said wheel, a steam supply passage through which steam is adapted to be supplied for driving said piston, a reservoir of selected volume with respect to the displacement of said piston, a brake valve device having a release position and operative upon movement out of said release position to effect charging of said reservoir with steam, reversing valve means adjustable in accordance with reciprocation of said piston and operative when said brake valve device is in said release position to control the steam supply from said passage to said piston for turning said wheel, and means cooperative with said reversing valve means upon movement of said brake valve device out of said release position to open communication between said reservoir and said cylinder at the leading side of said piston in accordance with the direction of movement of said piston in said cylinder to thereby subject first one leading side and then the other to the pressure of steam in said reservoir for opposing reciprocation of said piston, and one-way flow means connecting said cylinder at the opposite sides of said piston to said reservoir arranged to provide for the flow of steam in the direction from said cylinder to said reservoir.

16. A brake arrangement for a wheel of a locomotive comprising a pressure cylinder, a reciprocatory piston therein operative by the application of steam first to one side and then to the opposite side to turn said wheel, a steam supply passage through which steam is adapted to be supplied for driving said piston, a brake valve device having a release position and operative upon movement therefrom to supply fluid at a desired pressure, valve means operative by the pressure of fluid supplied by said brake valve device to supply steam at a proportional pressure, reversing valve means adjustable in accordance with the reciprocation of said piston to control the supply of steam to the opposite sides of said piston and operative when said brake valve device is in said normal position to effect a supply of steam from said passage to said piston for turning said wheel, and means cooperative with said reversing valve means upon operation of said brake valve device to supply steam, provided by said valve means in response to operation of said brake valve device, to the opposite faces of said piston in such an order as to oppose movement of said piston by said wheel to thereby brake said wheel.

17. A brake arrangement for a wheel of a locomotive comprising a pressure cylinder, a reciprocatory piston therein operative by the application of steam first to one side and then to the opposite side to turn said wheel, a steam supply passage through which steam is adapted to be supplied for driving said piston, a reservoir of selected volume with respect to the displacement of said piston, a brake valve device having a release position and operative upon movement therefrom to supply fluid at a desired pressure, valve means operative by the pressure of fluid supplied by said brake valve device to supply steam at a proportional pressure to said reservoir, reversing valve means adjustable in accordance with the reciprocation of said piston and operative when said brake valve device is in said release position to control the supply of steam from said passage to said piston for turning said wheel, and means cooperative with said reversing valve means upon movement of said brake valve device from release position to supply steam from said valve means first to one side of said piston and then to the opposite side in such an order as to oppose movement of said piston by said wheel to thereby brake said wheel, and pressure limiting means controlled by the opposing pressures of fluid supplied by said brake valve device and steam in said reservoir operative to limit the pressure of steam supplied to said reservoir.

18. A brake arrangement for a wheel of a locomotive comprising a pressure cylinder, a reciprocatory piston therein operative by the application of steam first to one side and then to the opposite side to turn said wheel, a steam supply passage through which steam is adapted to be supplied for driving said piston, a reservoir of selected volume with respect to the displacement of said piston, a brake valve device having a release position and operative upon movement therefrom to supply fluid at a desired pressure, valve means operative by the pressure of fluid supplied by said brake valve device to supply steam at a proportional pressure to said reservoir, reversing valve means adjustable in accordance with the reciprocation of said piston and operative when said brake valve device is in said release position to control the supply of steam from said passage to said piston for turning said wheel, and means cooperative with said reversing valve means upon movement of said brake valve device from release position to supply steam from said valve means first to one side of said piston and then to the opposite side in such an order as to oppose movement of said piston by said wheel to thereby brake said wheel, and pressure limiting means subject to the opposing pressures of fluid supplied by said brake valve device and steam in said reservoir operative upon an increase in steam pressure in said reservoir to a desired degree to open a vent from said reservoir.

19. A brake arrangement for a wheel of a locomotive comprising a pressure cylinder, a reciprocatory piston therein operative by the application of steam first to one side and then to the opposite side to turn said wheel, a steam supply passage through which steam is adapted to be supplied for driving said piston, a reservoir of selected volume with respect to the displacement of said piston, a brake valve device having a release position and movable therefrom to effect charging of said reservoir with steam, reversing valve means operable in accordance with reciprocation of said piston when said brake valve device is in said release position to supply steam from said passage first to one side of said piston and then to the opposite side for turning said wheel, and means cooperative with said reversing valve means upon movement of said brake valve device out of said release position to open communication between said reservoir and cylinder at the leading face of said piston in accordance with the direction of movement of said piston to thereby subject first one leading face of said piston and then the other to the pressure of steam in said reservoir for opposing reciprocation of said piston, said reversing valve means in the normal position of said brake valve device opening first one leading face of said piston and then the opposite to an exhaust, and means operative upon movement of said brake valve device out of said release position to close said exhaust.

20. A brake arrangement for a wheel of a locomotive comprising a power cylinder, a reciprocatory piston therein operative by the application of steam first to one side and then to the opposite side to turn said wheel, a steam supply passage through which steam is adapted to be supplied for driving said piston, reversing valve means adjustable for movement of said locomotive in said one direction to supply steam from said supply passage first to one side of the piston and then to the opposite side upon reciprocation thereof for actuating said piston to turn said wheel in one direction, said reversing valve means being adjustable for movement of the locomotive in the opposite direction to supply steam from said supply passage to the opposite sides of said piston upon reciprocation thereof in such an order as to actuate said piston to turn said wheel in the opposite direction, a brake valve device operative manually to effect a supply of steam to said passage, and means operative in response to the operation of said brake valve device with the locomotive running in one direction to condition said reversing valve means for power control of the locomotive in the opposite direction to thereby alternately open first one leading face of the piston and then the other to said passage whereby the pressure of steam supplied in response to operation of said brake valve device is operative to oppose reciprocation of said piston.

21. A brake arrangement for a wheel of a locomotive comprising a power cylinder, a reciprocatory piston therein operative by the application of steam first to one side and then to the opposite side to turn said wheel, a steam supply passage through which steam is adapted to be supplied for driving said piston, reversing valve means adjustable for movement of said locomotive in said one direction to supply steam from said supply passage first to one side of the piston and then to the opposite side upon reciprocation thereof for actuating said piston to turn said wheel in one direction, said reversing valve means being adjustable for movement of the locomotive in the opposite direction to supply steam from said supply passage to the opposite sides of said piston upon reciprocation thereof in such an order as to actuate said piston to turn said wheel in the opposite direction, a brake valve device operative manually to effect a supply of steam to said passage, and means operative in response to the operation of said brake valve device with the locomotive running in one direction to condition said reversing valve means for power control of the locomotive in the opposite direction to thereby alternately open first one leading face of the piston and then the other to said passage whereby the pressure of steam supplied in response to operation of said brake valve device is operative to oppose reciprocation of said piston, said reversing valve means when operating to supply fluid to said piston for actuating same to turn said wheel also opening upon reciprocation of said piston first one and then the other leading side of said piston to an exhaust, and means responsive to operation of said brake valve device to close said exhaust.

22. A brake arrangement for a wheel of a steam locomotive comprising a steam cylinder, a reciprocatory piston therein connected to said wheel, a passage through which steam is adapted to be supplied for propelling said locomotive, a reversing valve operative to connect alternately the opposite faces of said piston either to said passage or to an exhaust, reverse gear conditionable in accordance with the desired direction of movement of the locomotive to render said reversing valve operable to alternately open one trailing side of said piston and then the other to said passage and to connect the opposite face of said piston to said exhaust for thereby subjecting said piston to the pressure of steam from said passage in such a manner as to turn said wheel in the desired direction, a brake valve device operable by the engineer, means operative in response to operation of said brake valve device while the locomotive is under motion to close said exhaust and to supply steam through said exhaust to said piston to oppose reciprocation thereof by said wheel, and pressure limiting means connected to said exhaust for limiting the pressure of steam applied to said piston.

23. A brake arrangement for a wheel of a steam locomotive comprising a steam cylinder, a reciprocatory piston therein connected to said wheel, a passage through which steam is adapted to be supplied for propelling said locomotive, a reversing valve operative to connect alternately the opposite faces of said piston either to said passage or to an exhaust, reverse gear conditionable in accordance with the desired direction of movement of the locomotive to render said reversing valve operable to alternately open one trailing side of said piston and then the other to said passage and to connect the opposite face of said piston to said exhaust for thereby subjecting said piston to the pressure of steam from said passage in such a manner as to turn said wheel in the desired direction, a brake valve device operable by the engineer, and means operative in response to operation of said brake valve device while the locomotive is under motion in one direction to supply steam to said passage and to effect operation of said reverse gear to condition said reversing valve for movement of the locomotive in the opposite direction.

24. A brake arrangement for a driver wheel of a locomotive comprising a power cylinder, a piston therein adapted to be reciprocated by the application of steam pressure from the locomotive boiler first to one trailing face and then to the opposite face for turning said wheel, a brake controlling device operative to effect a supply of steam from said boiler for acting first on one leading face and then on the opposite face of said piston for opposing reciprocation thereof by said wheel, reversing valve means operative in accordance with the reciprocation of said piston to normally control the supply of steam from said boiler to said piston for turning said wheel and cooperative with said brake controlling device upon operation thereof to control the supply of steam to said piston for opposing turning of said wheel, and means operative to limit the pressure of steam supplied for opposing rotation of said wheel to a degree independent of the pressure of steam in said boiler.

25. A brake arrangement for a driver wheel of a locomotive comprising a power cylinder, a piston therein adapted to be reciprocated by the application of steam pressure from the locomotive boiler first to one trailing face and then to the opposite face for turning said wheel, a brake controlling device operative to effect a supply of steam from said boiler for acting first on one leading face and then on the opposite face of said piston for opposing reciprocation thereof by said wheel, reversing valve means operative in accordance with the reciprocation of said piston to normally control the supply of steam from said boiler to said piston for turning said wheel and cooperative with said brake controlling device upon operation thereof to control the supply of steam to said piston for opposing turning of said wheel, and means conditioned by said operation of said brake controlling device to limit the pressure of steam supplied for opposing rotation of said wheel to a desired degree.

26. A brake arrangement for a driver wheel of a locomotive comprising a power cylinder, a piston therein adapted to be reciprocated by the application of steam pressure first to one trailing side and then the opposite for driving said wheel, reversing valve means normally operative to control the supply of steam to the opposite sides of said piston for actuating same to turn said wheel, a brake control pipe, means responsive to an increase in pressure in said pipe to effect a supply of steam to a passage and to condition said reversing valve means to connect said passage first to one and then to the other leading side of said piston upon reciprocation thereof whereby the steam from said passage may act on said piston to oppose rotation of said wheel.

27. A brake arrangement for a driver wheel of a locomotive comprising a power cylinder, a piston therein adapted to be reciprocated by the application of steam pressure first to one trailing side and then the opposite for driving said wheel, reversing valve means normally operative to control the supply of steam to the opposite sides of said piston for actuating same to turn said wheel, a brake control pipe, means responsive to the pressure in said pipe to supply steam at a proportional pressure to a passage, and other means operative upon a variation in pressure in said pipe to condition said reversing valve means to connect said passage first to one leading side of said piston and then the opposite upon reciprocation of said piston whereby the steam from said passage will act on said piston to oppose rotation of said wheel.

28. A brake arrangement for a driver wheel of a steam locomotive having a reciprocatory piston connected to said wheel and operative by steam alternately supplied first to one trailing side of the piston and then to the opposite trailing side when the leading side of the piston is open to an exhaust communication to effect rotation of said wheel for propelling said locomotive, and reversing valve means operative automatically in accordance with reciprocation of said piston to control said supply of steam to said piston and the opening of the leading side of said piston to said exhaust communication, said brake arrangement comprising brake control means operative to close said exhaust communication and to condition said reversing valve means to supply steam alternately first to one leading face and then the other of said pistons upon reciprocation of said piston to oppose such reciprocation, and means operative to render said brake control means either operating or non-operating.

29. A brake arrangement for a driver wheel of a locomotive comprising a power cylinder, a reciprocatory piston in said cylinder adapted to be operated by steam supplied to the trailing side when the leading side is open to an exhaust communication to turn said wheel, reversing valve means normally operative to supply steam to the trailing side of said piston and to open the leading side of said piston to said exhaust communication upon reciprocation of the piston, brake control means having a brake application condition for supplying steam and for closing said exhaust communication and having a brake release position for cutting off the supply of steam and for opening said exhaust communication, and means operative in accordance with the condition of said brake control means for controlling said reversing valve means and operative when said brake control means is in said brake release position to provide said normal operation of said reversing valve means and in said brake application position to condition said reversing valve means to supply steam supplied by said brake control means to the leading face of said piston and to connect the trailing face of said piston to said exhaust communication in accordance with the direction of movement of said piston in said cylinder to thereby oppose turning of said wheel.

30. A brake arrangement for a driver wheel of a locomotive comprising a power cylinder, a piston therein adapted to be reciprocated by the alternate application of steam pressure from the locomotive boiler first to one trailing face of said piston and then the opposite for turning said wheel, reversing valve means normally operative in accordance with the direction of movement of the locomotive for controlling the supply of steam to the opposite faces of said piston for actuating same to turn said wheel, brake controlling means on the locomotive, means responsive to operation of said brake controlling means to supply steam for braking said locomotive, and other means also responsive to said operation of said brake controlling means and cooperative with said reversing valve means to supply the braking steam first to one leading face of said piston and then the other, upon reciprocation of said piston, to oppose turning of said wheel for thereby braking the locomotive.

31. A brake arrangement for a driver wheel of a locomotive comprising a power cylinder, a piston therein adapted to be reciprocated by the application of steam pressure first to one trailing side and then the other upon reciprocation of said piston and with the leading side of said piston open to an exhaust for turning said wheel, reversing valve means normally automatically operable in accordance with reciprocation of said piston to control the supply of steam to said trailing sides of said pistons and the opening of the leading sides of said piston to said exhaust in such an order as to cause movement of said locomotive in one direction and conditionable to reverse said order to cause movement of said locomotive in a reverse direction, means for closing said exhaust, and brake control means having a brake release condition and a brake application condition controlling said reversing valve means and the exhaust closing means and providing in said brake release condition said normal operation of said reversing valve means and opening of said exhaust, said brake control means being operative in said brake application condition with the locomotive moving in one direction to effect operation of said exhaust closing means to close said exhaust and to reverse the condition of said reversing valve means to thereby alternately subject the leading face of said piston to pressure of steam and to draw a partial vacuum at the trailing face of said piston, as the piston reciprocates, for opposing such reciprocation.

ELLIS E. HEWITT.
BURTON S. AIKMAN.